United States Patent [19]
Fujie et al.

[11] Patent Number: 5,466,038
[45] Date of Patent: Nov. 14, 1995

[54] SLIDING ROOF DEVICE

[75] Inventors: Naofumi Fujie, Nagoya; Kenichi Fukura, Toyota; Koichi Ito, Anjyo; Tetsuya Hirata, Kariya; Naoto Nishio, Toyota, all of Japan

[73] Assignees: Aisin Seiki Kabushiki Kaisha, Kariya; Toyota Jidosha Kabushiki Kaisha, Toyota, both of Japan

[21] Appl. No.: 355,414

[22] Filed: Dec. 12, 1994

Related U.S. Application Data

[63] Continuation of Ser. No. 118,177, Sep. 9, 1993, abandoned.

[30]    Foreign Application Priority Data

Sep. 16, 1992  [JP]  Japan ................................ 4-270778
Jul. 23, 1993  [JP]  Japan ................................ 5-201994

[51] Int. Cl.⁶ ...................................................... B60J 7/04
[52] U.S. Cl. ................................................ 296/213; 296/208
[58] Field of Search ................................... 296/208, 213

[56]          References Cited

U.S. PATENT DOCUMENTS

| 4,671,565 | 6/1987 | Grimm et al. | 296/213 X |
|---|---|---|---|
| 4,892,351 | 1/1990 | Ono et al. | 296/213 |
| 5,022,705 | 6/1991 | Takahashi | 296/213 |
| 5,052,744 | 10/1991 | Sugimoto | 296/213 |
| 5,104,178 | 4/1992 | Bienert | 296/223 X |

FOREIGN PATENT DOCUMENTS

| 3718121 | 12/1988 | Germany | 296/208 |
|---|---|---|---|
| 11941 | 1/1984 | Japan | 296/213 |
| 0213517 | 12/1984 | Japan | 296/213 |
| 61-35005 | 8/1986 | Japan . | |
| 3-227 | 1/1991 | Japan . | |
| 4031124 | 2/1992 | Japan | 296/213 |

*Primary Examiner*—Dennis H. Pedder
*Attorney, Agent, or Firm*—Burns, Doane, Swecker & Mathis

[57]          ABSTRACT

A sliding roof device for vehicles includes a pair of guide rails each being oppositely provided in vehicle longitudinal direction, an opening provided in a vehicle roof, a roof panel slidable in the vehicle longitudinal direction along the pair of guide rails for opening and closing the opening of the roof, a U-shaped extension formed integrally with the pair of guide rails and a rain gutter having a U-shaped channel and motor drive bracket which is provided on the U-shaped extension of the guide rails.

11 Claims, 8 Drawing Sheets

SLIDING ROOF DEVICE

This application is a continuation of application Ser. No. 08/118,177, filed Sep. 9, 1993, now abandoned.

BACKGROUND OF THE INVENTION

1. Field of the Invention

This invention relates to a sliding roof device, and more particularly to a sliding roof device for opening and closing an opening of a vehicle roof.

2. Description of the Related Arts

Figure 6:
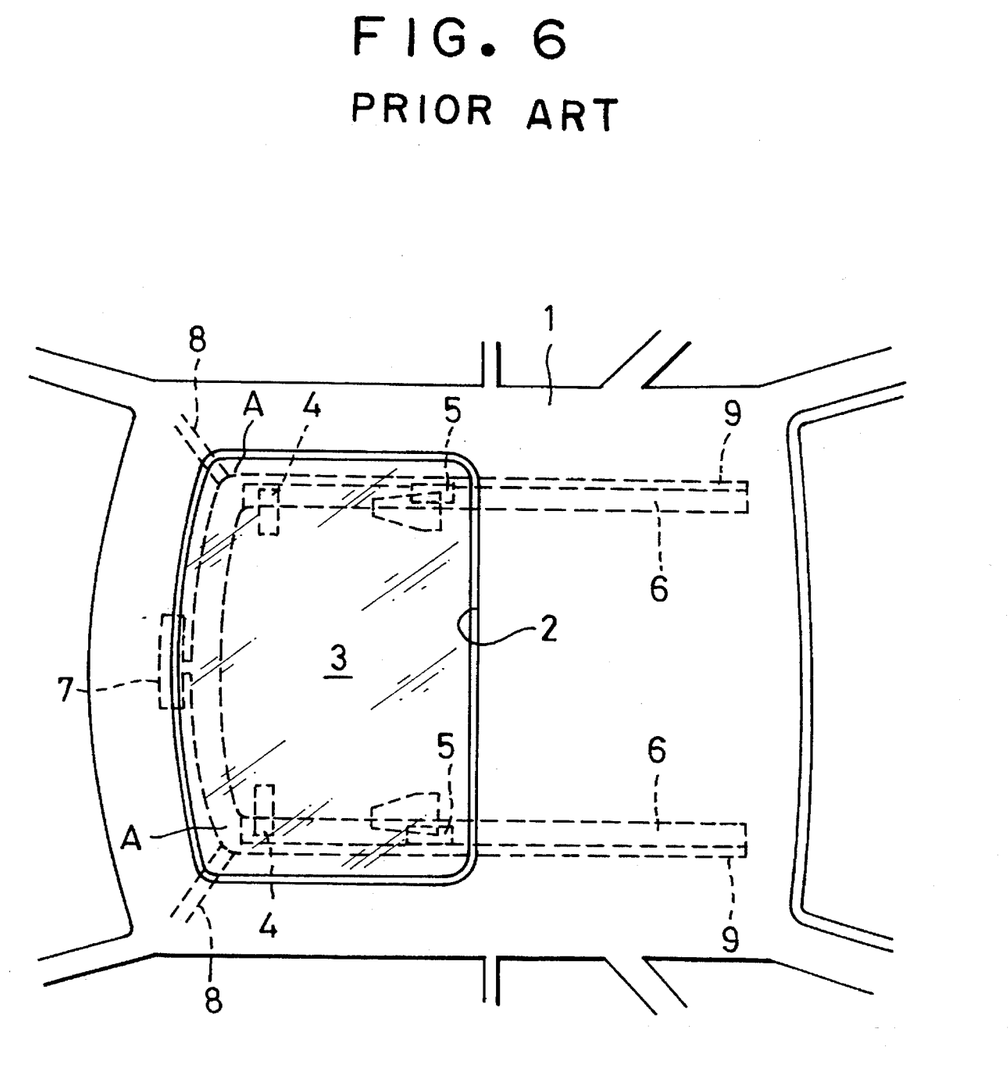
FIG. 6 shows a plane view of a general type of sliding roof devide.

A sliding roof for vehicles is generally shown in FIG. 6, wherein a pair of guide rails 6, 6 are provided in a longitudinal direction of the vehicle. An opening 2 is provided in a roof 1 of the vehicle and a slide panel 3, generally formed by a transparent material such as a glass, is slidably disposed in the opening 2 to open or close the opening 2 of the roof 1 by the slidable movement along the guide rails 6, 6. Numerals 4, 4 designate slide elements and numerals 5, 5 designate shoes. These shoes and slide elements are connected to the slide panel 3 through cables (not shown) and slidably guided in the guide rails 6, 6. Numeral 7 designates an actuator, such as an electric motor, for driving the cables. Numerals 9, 9 designate rain gutters for discharging rain therein to the outside of the vehicle through pipes 8, 8.

Figure 7:
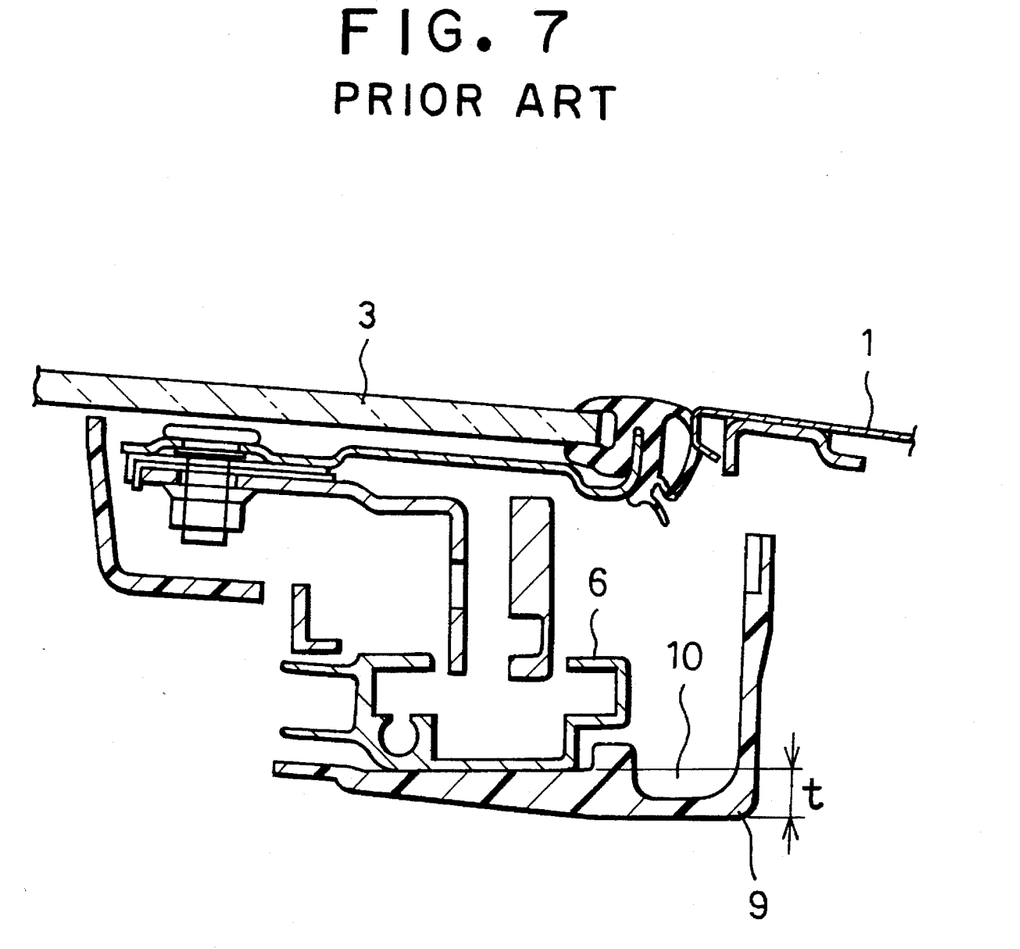
FIG. 7 shows a cross-sectional view similar to FIG. 2, but showing a prior art device.

The rain gutter and the guide rail structure of a conventional type is shown in FIG. 7, which corresponds to the Japanese Patent Publication No. 61-35005(1986). In this prior art, an aluminum-based alloy guide rail 6 is secured to a housing 9 made of resin which has a rain gutter portion 10 having a U-shaped cross section next to the guide rail 6.

Figure 8:
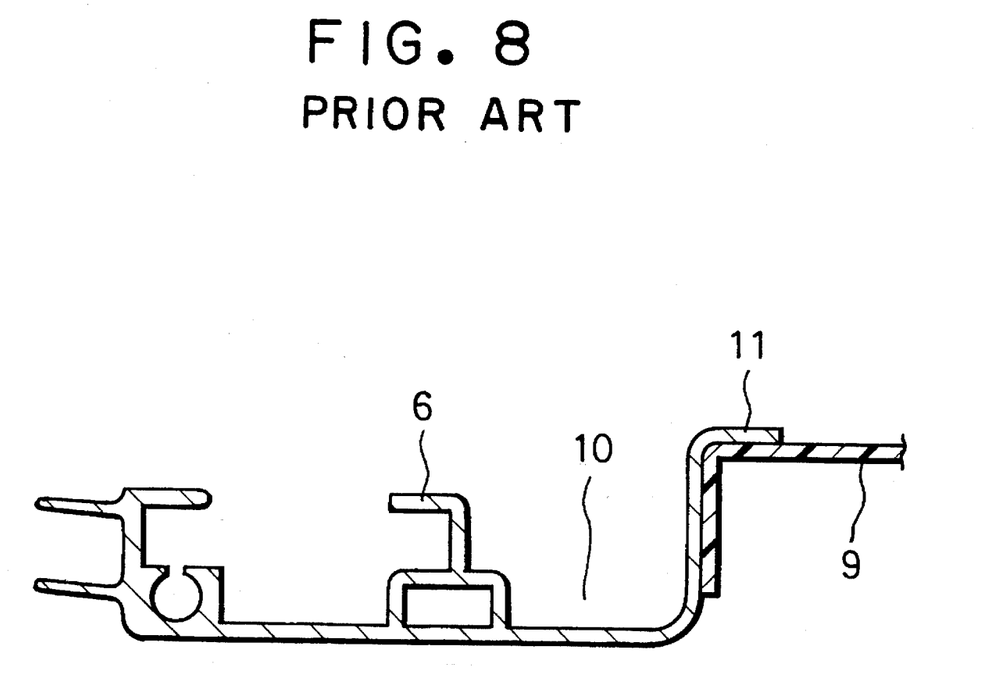
FIG. 8 shows a cross section of another prior art sliding roof device.

Another conventional type of a guide rail structure is shown in FIG. 8, which corresponds to the Japanese Utility Model Laid-Open Publication No. 3-227(1991). In this prior art, an extension is formed integrally with the guide rail 6 to form a U-shaped rain gutter 10 in cross section. The free end of the extension is secured to a housing portion 9 at the point 11 to fixedly secure the guide rail 6 to the vehicle body (not shown). Since the extension is formed integrally with the guide rail 6, the vertical thickness of the structure is relatively small compared to that shown in FIG. 7. In other words, the vertical thickness (t) in FIG. 7 is not necessary for the type shown in FIG. 8. This is important because a vehicle having a sliding roof device has to have some limited space under the roof to accomodate parts of sliding roof device. In a limited space of the compartment of a vehicle, such space as required for mounting the sliding roof device has to be small as possible. The conventional type shown in FIG. 8 may obviate disadvantages of the type shown in FIG. 7, but may have another disadvantage that the forming of the U-shaped gutter portion 10 by a bending process is difficult due to possible shape change at the bent portion after the hot extrusion process of aluminum alloy guide rail. This will, in turn, lead to difficulties in securing the flange portion 11 to the housing 9. Further, during the bending process, corner portions shown in FIG. 6 as "A" may shrink and conventionally to avoid such disadvantages, such corner portions A are cut after the bending process and replaced with corner pieces prepared separately. This requires another step for manufacturing the guide rails.

SUMMARY OF THE INVENTION

Accordingly, it is an object of the present invention to obviate the above conventional drawbacks.

It is another object of the invention to provide an improved sliding roof device which is simple in design and compact in size.

According to the present invention, a sliding roof device for vehicles includes a pair of guide rails, each being provided oppositely in a longitudinal direction of the vehicle, an opening provided in a vehicle roof, a roof panel slidable along the pair of guide rails for opening and closing the opening of the roof, an extension of a U-shaped cross section integrally formed with each of the pair of guide rails and a rain gutter having a channel provided overlappingly on the extension of the guide rails for discharging rain or water in the channel outward the vehicle.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate several embodiments of the present invention and together with the description, serve to explain the principles of the invention.

DESCRIPTION OF THE PREFERRED EMBODIMENTS

Figure 1:
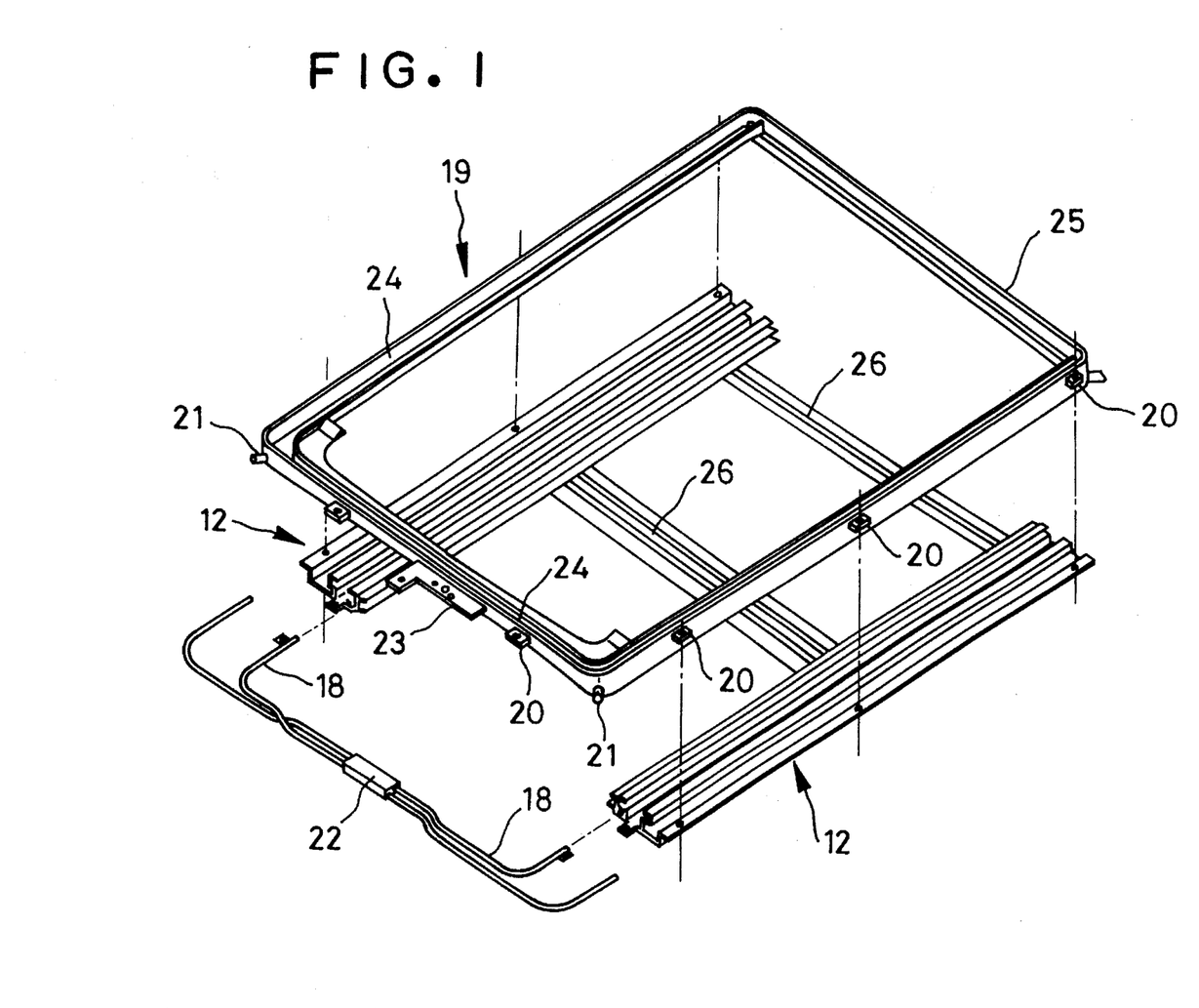
FIG. 1 shows a perspective view of the sliding roof device according to the present invention.
Figure 2:
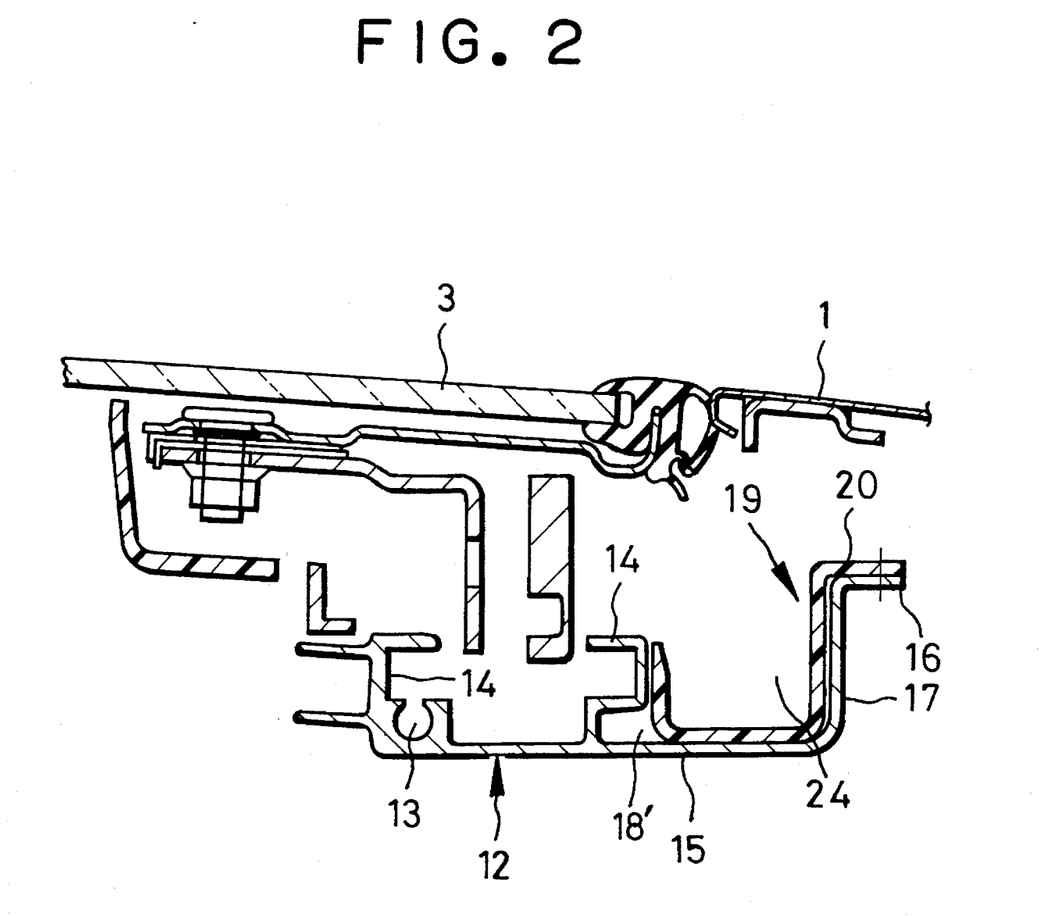
FIG. 2 shows a cross-sectional view showing detail structure of a guide rail and a rain gutter.

Referring now to FIGS. 1 and 2 a sliding roof device for vehicles has a pair of guide rails 12, 12 to which pipes 18, 18 are secured.

Cables (not shown) will be inserted into the pipes 18, 18 and guided in hole 13 and space 18' of the guide rails. In FIG. 2, the guide rails 12, 12 have a pair of opposing walls 14, 14 for receiving shoes 5, 5 (FIG. 6) disposed between side panel 3 and cables.

Numeral 15 designates an extension which extends outwardly from the bottom wall of the guide rails 12, 12. The extension 15 has an upright wall 17, the outer periphery thereof being provided with flange 16. The flange 16 is secured to vehicle structure (not shown) by bolts or other suitable securing means.

The guide rails 12, 12 are made of aluminum based alloy under the extrusion process. The rain gutter 19 is made of synthetic resin. The rain gutter 19 has side portions and front portion having U-shape cross section as clearly shown in FIG. 1. The rain gutter 19 is secured to the guide rails 12, 12 by attachments 20, 20.

Numerals 21, 21 designate pipes for discharging water or rain in the gutter 19 out of the vehicle. At the front portion of the rain gutter 19, a piece of another attachment 23 is provided for attaching an actuating portion 22 of the slide roof device. The actuating portion 22 includes a motor and a gear mechanism for driving cables with shoes 5, 5.

Figure 3:
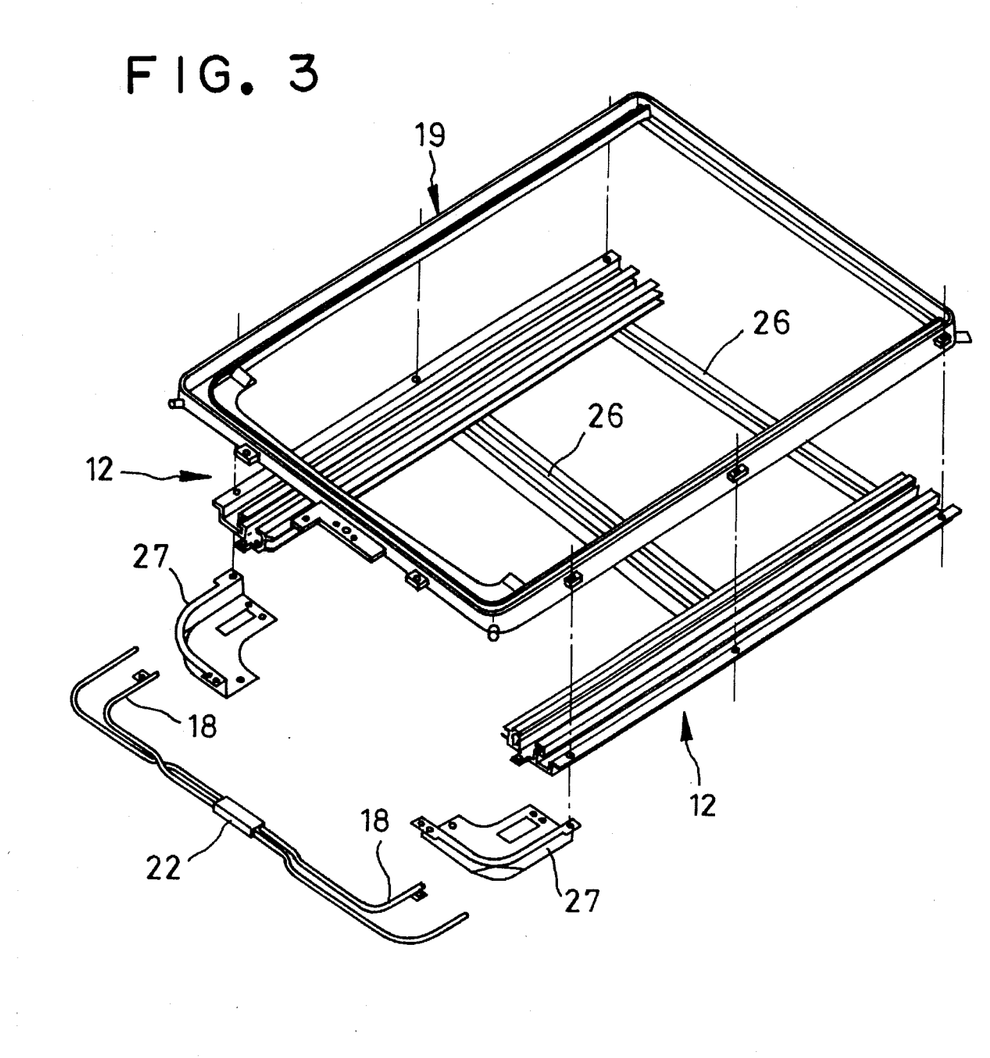
FIG. 3 shows a view for another embodiment of the present invention, and showing a perspective view similar to FIG. 1.

Numeral 25 designates a reinforcement means for the gutter 19. Reinforcement members 26, 26 are provided between guide rails 12, 12. As particularly shown in FIG. 3, a pair of corner pieces 27, 27 are provided at each front end of the guide rails 12, 12 and secured to the gutter 19 through the flange 16 of the guide rails to strengthen the rigidity of the guide rails as well as for guiding the cables.

Figure 4:
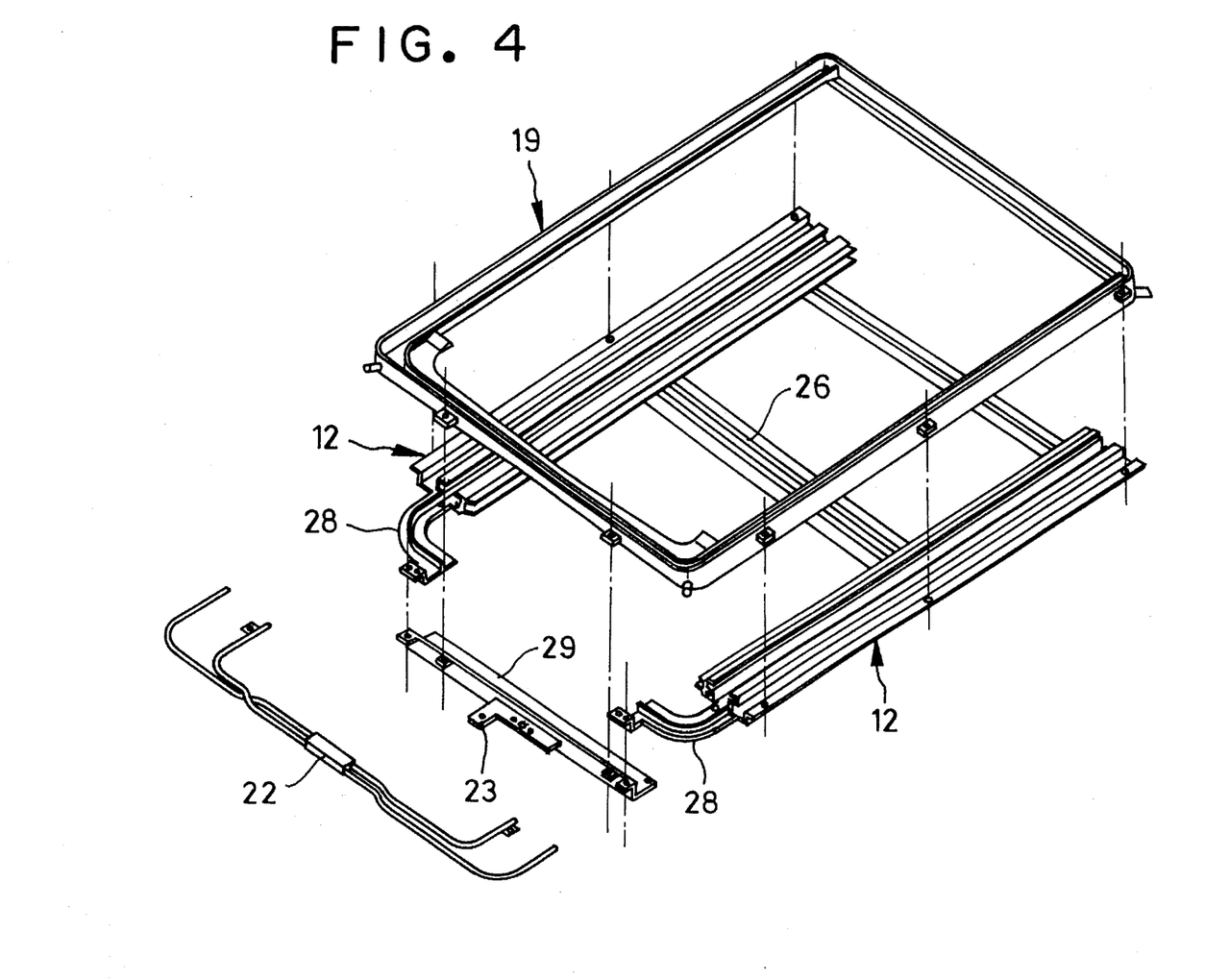
FIG. 4 shows a view for still another embodiment of the present invention, and showing a perspective view similar to FIG. 1.

In FIG. 4, a pair of bent pieces 28, 28 are provided on each front end of the guide rails 12, 12. Each bent piece 28 forms an extended guide rail for slidably receiving the shoes 5, 5 (FIG. 6).

A connecting plate 29 is provided for securing the bent pieces 28, 28 to the gutter 19. The connecting plate 29 has an attachment 23 for securing the actuating portion 22 of the sliding roof device. The connecting plate 29 is formed of aluminum based alloy or high strength synthetic resin to reinforce the connection with the guide rails as well as to absorb the load from the actuating portion 22.

Figure 5:
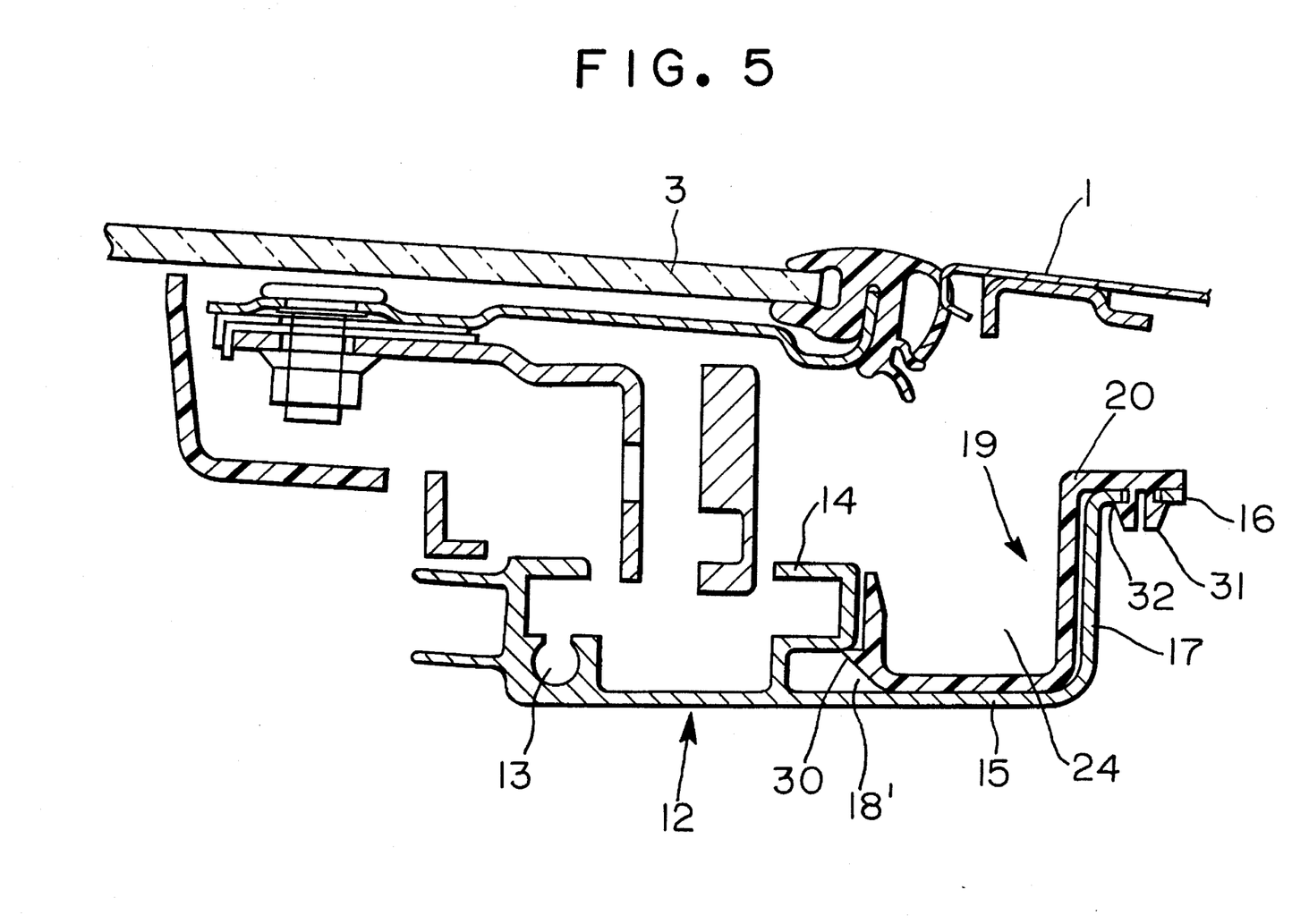
FIG. 5 shows a cross-sectional view of the present invention similar to FIG. 2, but showing a securing portion between the guide rail and the rain gutter.

In FIG. 5, the gutter 19 is secured to the flange 16 of the extension 15 of the guide rails 12, 12. The gutter 19 has the attachment 20, each of which has a clip portion 31. The clip portion 31 is inserted into the flange through a hole 32 provided in the flange 16 to fixedly secure the gutter 19 to the guide rails 12, 12.

The gutter 19 also is provided with an inwardly projected portion 30 at the inner side wall of the gutter 19. The projected portion 30 is engaged with the upper wall of space 18' of the guide rails 12, 12 for preventing the gutter 19 from an inadvertent upward removal thereof.

As many apparently widely different embodiments of the present invention can be made without departing from the spirit and scope thereof, it is to be understood that the invention is not limited to the specific embodiments thereof except as defined in the appended claims.

What is claimed is:

1. A sliding roof device for vehicles which possess a roof and an opening in the roof having opposed side walls, comprising:

a pair of guide rails each of which is positionable along one of the opposed side walls of the opening;

a roof panel slidable along the pair of guide rails for opening and closing the opening in the vehicle roof;

drive means connected to the roof panel for slidably moving the roof panel in a reciprocating manner along the guide rails;

extension means formed integrally with and manufactured in one piece with each of the guide rails for defining an extension of each respective guide rail, each extension means including a linear extension portion extending from the guide rail and a vertical extension portion extending from the linear extension portion; and a rain gutter having a channel which is U-shaped in cross-section and which is provided on the extension means of each guide rail, the rain gutter including a pair of side portions which are each positioned in one of the extension means and an end portion integral with the pair of side portions, the end portion of the rain gutter being provided with a bracket for attachment of said drive means.

2. A sliding roof device according to claim 1, wherein each of the guide rails has oppositely positioned free ends.

3. A sliding roof device according to claim 2, wherein the extension means and the rain gutter having connecting portions extending outwardly for connecting the extension means to the rain gutter.

4. A sliding roof device according to claim 3, wherein the connecting portion of the rain gutter has a clip portion to which the connecting portion of the extension means is secured.

5. A sliding roof device according to claim 1, wherein a pawl is provided on an inner side wall of the U-shaped channel of the rain gutter, said pawl engaging the guide rails for preventing the gutter from upward movement.

6. A sliding roof device according to claim 1, wherein each of the guide rails is provided with an extended curved portion at a front end thereof.

7. A sliding roof device for vehicles which possess a roof portion and an opening in the roof portion having opposed sides, comprising:

a roof panel positionable in the roof portion for opening and closing the opening in the roof portion by slidable movement in a longitudinal direction of the vehicle;

a pair of guide rails which are each positionable along one of the sides of the opening for guiding the roof panel during slidable movement;

an actuator operatively associated with the roof panel for moving the roof panel along the guide rails; and rain gutter means for catching rain, said rain gutter means including a pair of extension means which are each formed integrally with and manufactured in one piece with one of the guide rails for defining an extension of the guide rail and a rain channel, the rain channel including oppositely disposed side portions which each overlie a respective one of the extension means and an end portion extending between said side portions, the pair of extension means and the side portions of the rain channel having outer flange portions, the outer flange portion of each side portion of the rain channel being connected to the outer flange portion of the respective extension means, the end portion of the rain channel including a bracket for attachment of said actuator.

8. A sliding roof device according to claim 7, wherein each of the guide rails has oppositely located free ends.

9. A sliding roof device according to claim 7, wherein a pawl is provided on an inner side wall of the rain channels to engage the guide rails for preventing the rain channel from moving upwardly.

10. A sliding roof device according to claim 9, wherein each guide rail has a front end provided with an extended curved portion.

11. A sliding roof device for vehicles which possess a roof and an opening in the roof having opposed side walls, comprising:

a pair of guide rails each of which is positionable along one of the opposed side walls of the opening;

a roof panel slidable along the pair of guide rails for opening and closing the opening in the vehicle roof;

drive means connected to the roof panel for slidably moving the roof panel in a reciprocating manner along the guide rails;

extension means formed integrally with and manufactured in one piece with each of the guide rails for defining an extension of each respective guide rail, each extension means including a linear extension portion extending from the guide rail and a vertical extension portion extending from the linear extension portion; and a rain gutter having a channel which is U-shaped in cross-section and which is provided on the extension means of each guide rail, the rain gutter being configured to define an overall rectangular shape in plan view that includes a pair of side portions which are each positioned in one of the extension means and front and rear end portions integral with the pair of side portions, the front end portion of the rain gutter being provided with a bracket for attachment of said drive means.

* * * * *